(12) United States Patent
Sheehan

(10) Patent No.: US 7,125,526 B2
(45) Date of Patent: Oct. 24, 2006

(54) SOLID STATE ULTRAVIOLET PHOTOCATALYTIC OXIDATION SYSTEM

(75) Inventor: Darren S. Sheehan, West Hartford, CT (US)

(73) Assignee: Carrier Corporation, Syracuse, NY (US)

( * ) Notice: Subject to any disclaimer, the term of this patent is extended or adjusted under 35 U.S.C. 154(b) by 371 days.

(21) Appl. No.: 10/722,618

(22) Filed: Nov. 26, 2003

(65) Prior Publication Data

US 2005/0109708 A1  May 26, 2005

(51) Int. Cl.
*B01J 19/08* (2006.01)

(52) U.S. Cl. .................... 422/186.3; 422/121

(58) Field of Classification Search ............. 422/186.3, 422/121
See application file for complete search history.

(56) References Cited

U.S. PATENT DOCUMENTS 5,919,422 A * 7/1999 Yamanaka et al. .......... 422/121
6,147,367 A * 11/2000 Yang et al. .................. 257/88

* cited by examiner

*Primary Examiner*—Kishor Mayekar
(74) *Attorney, Agent, or Firm*—Carlson, Gaskey & Olds

(57) ABSTRACT

An LED ultraviolet photocatalytic oxidation device is provided in a fluid handling system, such as an air handling system. In one embodiment, the photocatalyst is disposed on a protective layer (e.g. glass, plastic or quartz) on the semiconductor of the LED. In another embodiment, the photocatalyst is disposed on the protective layer, which is separated from the semiconductor by a fluid that filters or changes the wavelengths emitted by the LED. In a third embodiment, the photocatalyst is disposed directly on the semiconductor of the LED.

20 Claims, 1 Drawing Sheet

SOLID STATE ULTRAVIOLET PHOTOCATALYTIC OXIDATION SYSTEM

BACKGROUND OF THE INVENTION

The present invention relates generally to fluid purification systems and more particularly to ultraviolet photocatalytic oxidation systems.

Some air-handling systems include ultraviolet photocatalytic oxidation systems. A substrate coated with a photocatalyst, such as TiO2, is positioned in the fluid stream. Ultraviolet light is directed onto the photocatalyst to produce an oxidation process that removes many gases and chemicals, such as volatile organic compounds, from the air. However, ultraviolet lights are expensive and must be replaced periodically. There is also a pressure drop across the substrate, which is positioned in the fluid stream.

It has been proposed to use light-emitting diodes to generate ultraviolet light which is then directed onto a photocatalyst to maintain a photocatalytic oxidation process. In one proposed design for a muddler, a commercially-available LED is spaced away from one axial end of an elongated glass rod. The outer surface of the glass rod (other than the one axial end) is coated with a photocatalyst.

SUMMARY OF THE INVENTION

The present invention provides an LED ultraviolet photocatalytic oxidation device in a fluid handling system, such as an air handling system. In one embodiment of the present invention, the photocatalyst is disposed on a protective layer (e.g. glass or quartz) on the semiconductor of the LED. In another embodiment, the photocatalyst is disposed on the protective layer, which is separated from the semiconductor by a fluid that filters or changes the wavelengths emitted by the LED. In a third embodiment, the photocatalyst is disposed directly on the semiconductor of the LED.

Coating the light-emitting diodes with the photocatalyst material combines the functions of the light source and the substrate. This improves the size, weight, pressure drop and maintenance of the photocatalytic system.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
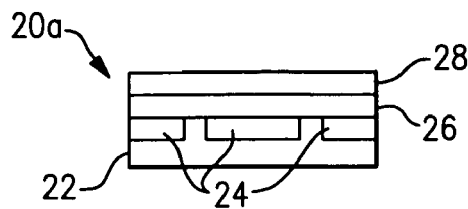
FIG. 1 is a cross-section of a photocatalytic oxidation device according to a first embodiment of the present invention.

FIG. 1 is a sectional view of a photocatalytic oxidation device 20a according to a first embodiment of the present invention. A semiconductor 22, such as Si, GaAs, or other suitable material, is doped to create one or more light-emitting diodes 24 in a conventional manner. As is known, the light-emitting diodes 24 generate ultraviolet light when a potential difference is applied across them.

A protective layer 26 covers the semiconductor 22 and light-emitting diodes 24. The protective layer 26 may be glass, plastic, quartz or any other material used to protect the semiconductor 22 while transmitting the ultraviolet light produced by the light-emitting diodes 24.

A photocatalyst 28 is disposed on an outer surface of the protective layer 26. The photocatalyst 28 may be TiO2, or any other known photocatalyst that removes gases and chemicals, such as volatile organic compounds, from the air.

Figure 2:
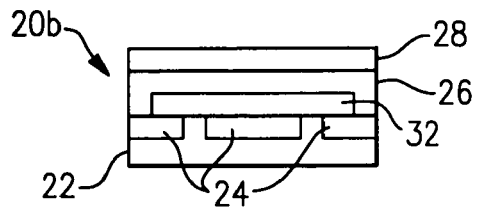
FIG. 2 is a cross-section of a photocatalytic oxidation device according to a second embodiment of the present invention.

FIG. 2 illustrates a second embodiment of the photocatalytic oxidation device 20b. In this embodiment, a fluid 32, such as a gas, is disposed between the light-emitting diodes 24 and the protective layer 26. The fluid 32 filters unwanted wavelengths or changes the wavelengths of the light emitted from the light-emitting diodes 24 so that the ultraviolet light that impacts the photocatalyst 28 contains the wavelengths necessary for photocatalytic oxidation.

Figure 3:
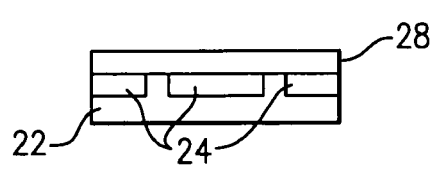
FIG. 3 is a cross-section of a photocatalytic oxidation device according to a third embodiment of the present invention.

A third embodiment of the photocatalytic oxidation device 20c is shown in FIG. 3. In this device 20c, the photocatalyst 28 is disposed directly on the outer surface of the semiconductor 22 and the light-emitting diodes 24.

Figure 4:
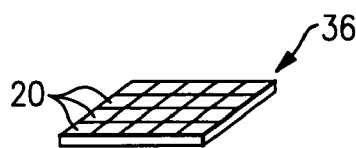
FIG. 4 is a perspective view of an array of photocatalytic oxidation devices of any of FIGS. 1–3.

As shown in FIG. 4, a plurality of photocatalytic oxidation devices 20 (the reference numeral "20" refers to any of the embodiments of the device 20a, b and c) are arranged in an array 36. The array 36 can be any size or shape, depending upon the particular application.

Figure 5:
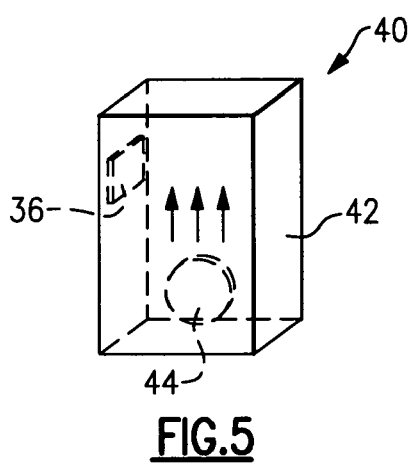
FIG. 5 is a perspective view showing the array of FIG. 4 installed in an air handling system.

One possible application of the photocatalytic oxidation device array 36 is shown schematically in FIG. 5. In FIG. 5, the array 36 is installed in an air handling system 40 for a home, building or vehicle. The air handling system 40 includes a housing or plenum 42 defining an air stream therein and a fan 44 for moving air through the plenum 42.

In operation, air passing through the plenum 42 contacts the outer surface of the photocatalytic array 36. Ultraviolet light from the light-emitting diodes 24 produces photocatalytic oxidation on the surface of the photocatalyst 28. The oxidation removes many gases and chemicals, such as volatile organic compounds, from the air. The light-emitting diodes 24 (FIGS. 1–3) in the photocatalytic device array 36 last much longer than conventional ultraviolet light sources, thereby significantly reducing maintenance on the photocatalytic device array 36.

Figure 6:
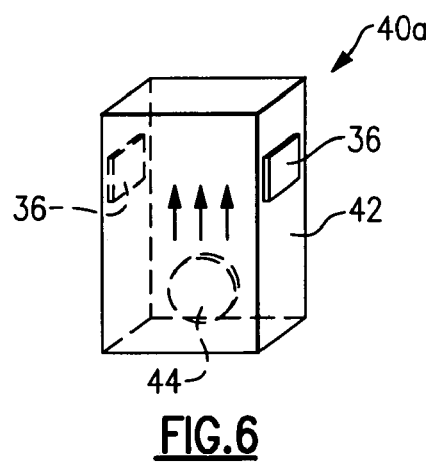
FIG. 6 is a perspective view showing two arrays like the array of FIG. 4 installed in an air handling system.

As shown in FIG. 6, an air handling system 40a could include at least two facing arrays 36 on opposite walls of the plenum 42. The air handling system 40a could also include facing arrays 36 (not shown) on the other pair of opposing walls of the plenum 42.

Figure 7:
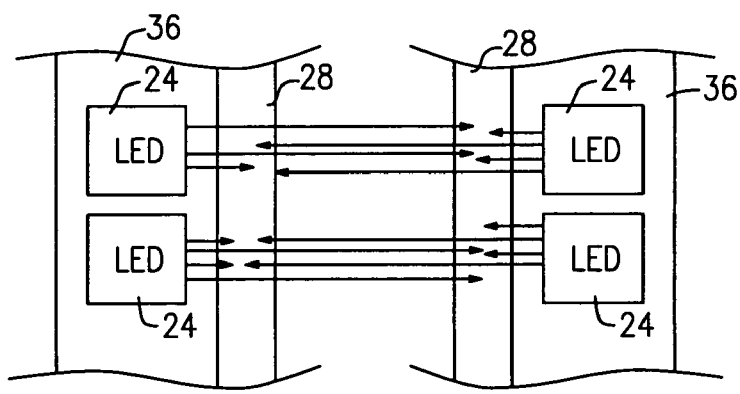
FIG. 7 is a schematic side sectional view showing the operation of the arrangement of arrays in FIG. 6.

FIG. 7 illustrates the operation of the arrangement of arrays 36 in FIG. 6. The thickness of the photocatalyst 28 on each of the arrays 36 is selected so that some of the ultraviolet light passes outwardly through the photocatalyst 28 on each array 36 and through the air onto the outer surface of the photocatalyst on the facing array 36. This arrangement provides an efficient use of the ultraviolet light from the LEDs 24. In the arrangement shown in FIGS. 6 and 7, the light sources could be standard ultraviolet light sources, but are preferably the LEDs described above.

Preferably the arrays 36 are the arrays 36 described above with respect to FIG. 4, which in turn preferably each comprise the photocatalytic oxidation devices 20*a–c*, of FIGS. 1–3.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A fluid purification system comprising:
   a semiconductor having an outer surface on which is formed a light-emitting diode adapted to produce ultraviolet light;
   a first layer disposed directly on the outer surface, the first layer adapted to transmit the ultraviolet light produced by the light-emitting diode; and
   a photocatalyst disposed on the first layer, the photocatalyst adapted to produce a photocatalytic oxidation process when the ultraviolet light is transmitted from the light-emitting diode to the photocatalyst.

2. The fluid purification system of claim 1 wherein the photocatalyst is disposed within a fluid stream.

3. The fluid purification system of claim 2 wherein the photocatalyst is disposed within an air stream in an air handling system.

4. The fluid purification system of claim 3 wherein the light-emitting diode is one of a plurality of light-emitting diodes adjacent one another.

5. The fluid purification system of claim 1 wherein the first layer is one of glass, plastic or quartz.

6. The fluid purification system of claim 1 wherein the light-emitting diode is one of a plurality of light-emitting diodes arranged at least substantially in a plane generally parallel to a plane containing the photocatalyst.

7. A fluid purification system comprising:
   a semiconductor having an outer surface on which is formed a light-emitting diode adapted to produce ultraviolet light;
   a fluid disposed immediately adjacent the outer surface of the semiconductor;
   a first layer disposed outwardly of the fluid and having an inner surface contacting the fluid, the fluid and the first layer adapted to transmit the ultraviolet light produced by the light-emitting diode from an outer surface of the first layer; and
   a photocatalyst disposed on the outer surface of the first layer, the photocatalyst adapted to produce a photocatalytic oxidation process when the ultraviolet light is transmitted from the light-emitting diode to the photocatalyst.

8. The fluid purification system of claim 7 wherein the light-emitting diode is one of a plurality of light-emitting diodes adjacent one another.

9. The fluid purification system of claim 7 wherein the photocatalyst is disposed within a fluid stream.

10. The fluid purification system of claim 9 wherein the photocatalyst is disposed within an air stream in an air handling system.

11. The fluid purification system of claim 10 wherein the light-emitting diode is one of a plurality of light-emitting diodes adjacent one another.

12. A fluid purification system comprising:
    a semiconductor having an outer surface on which is formed a light-emitting diode adapted to produce ultraviolet light; and
    a photocatalyst disposed directly on the outer surface, the photocatalyst adapted to produce a photocatalytic oxidation process when the ultraviolet light is transmitted from the light-emitting diode to the photocatalyst.

13. The fluid purification system of claim 12 wherein the light-emitting diode is one of a plurality of light-emitting diodes adjacent one another.

14. The fluid purification system of claim 12 wherein the photocatalyst is disposed within a fluid stream.

15. The fluid purification system of claim 14 wherein the photocatalyst is disposed within an air stream in an air handling system.

16. The fluid purification system of claim 15 wherein the light-emitting diode is one of a plurality of light-emitting diodes adjacent one another.

17. A purification system comprising:
    a first ultraviolet light source;
    a second ultraviolet light source; and
    a first photocatalyst positioned between the first ultraviolet light source and the second ultraviolet light source, the first photocatalyst having a first surface facing the first ultraviolet light source and an opposite second surface facing the second ultraviolet light source, the first ultraviolet light source adapted to direct ultraviolet light onto the first surface of the first photocatalyst and to cause photocatalytic oxidation and the second ultraviolet light source adapted to direct ultraviolet light onto the second surface of the first photocatalyst to cause photocatalytic oxidation by the first photocatalyst.

18. The purification system of claim 17 further including a second photocatalyst spaced away from the first photocatalyst, positioned between the first and second ultraviolet light sources, and positioned between the first photocatalyst and the second ultraviolet light source the second photocatalyst having a first surface facing the first photocatalyst and an opposite second surface facing the second ultraviolet light source.

19. The purification system of claim 18 wherein a first portion of the ultraviolet light from the first photocatalyst passes through the first photocatalyst onto the second photocatalyst.

20. The purification system of claim 19 wherein a first portion of the ultraviolet light from the second photocatalyst passes through the second photocatalyst onto the first photocatalyst, and wherein the first and second ultraviolet light sources each comprise at least one light-emitting diode.

* * * * *